May 22, 1956 J. DOLZA ET AL 2,746,427
PRESSURE SENSING APPARATUS
Filed Jan. 31, 1951 8 Sheets-Sheet 2

INVENTORS
John Dolza and
Robert D. Harvey
by Willits Hardman & Fehr
their ATTORNEYS

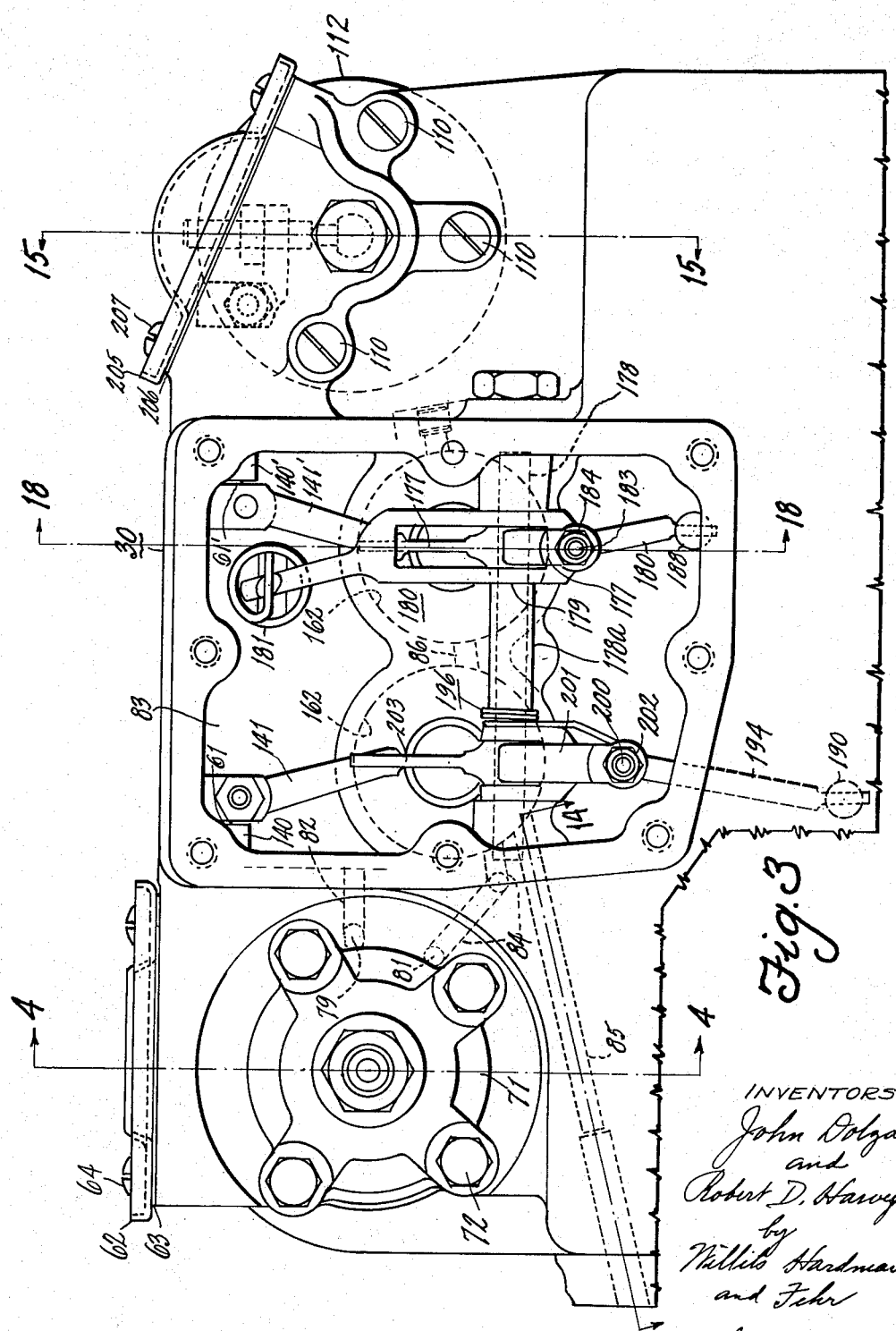

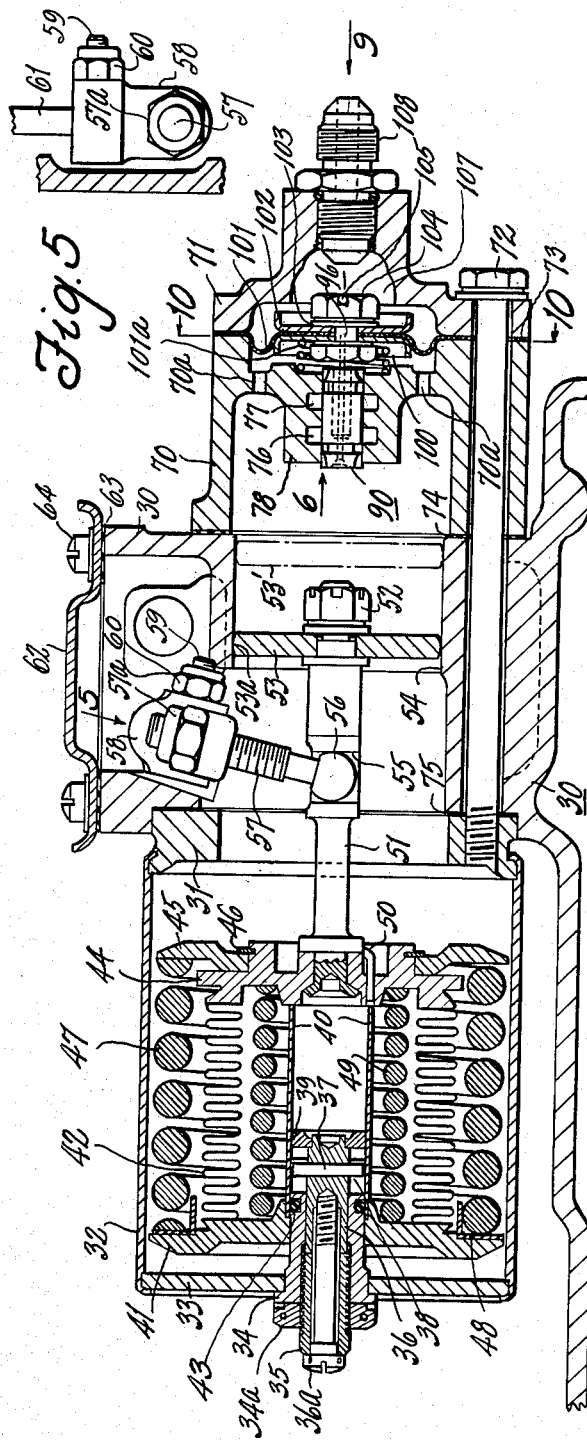

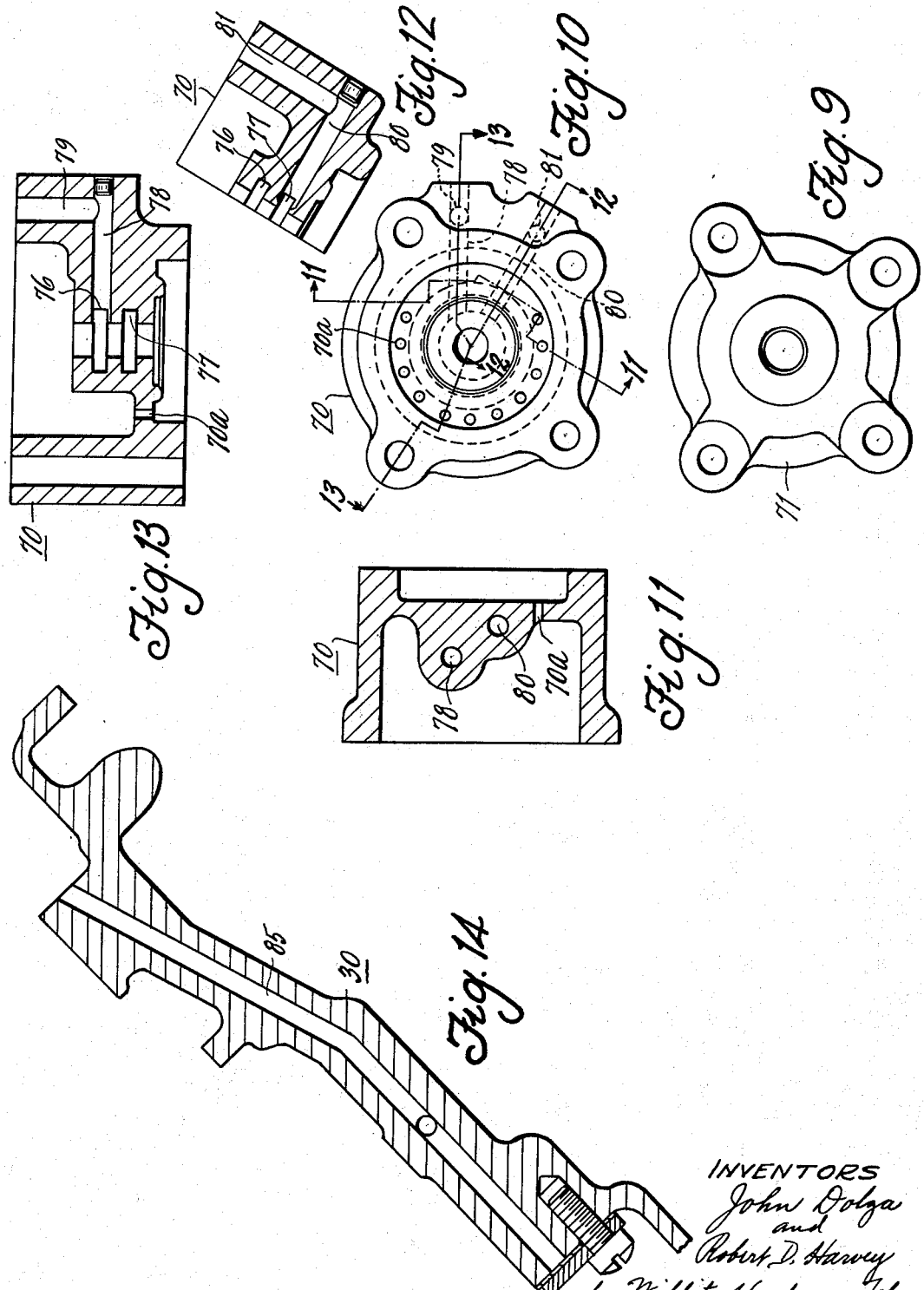

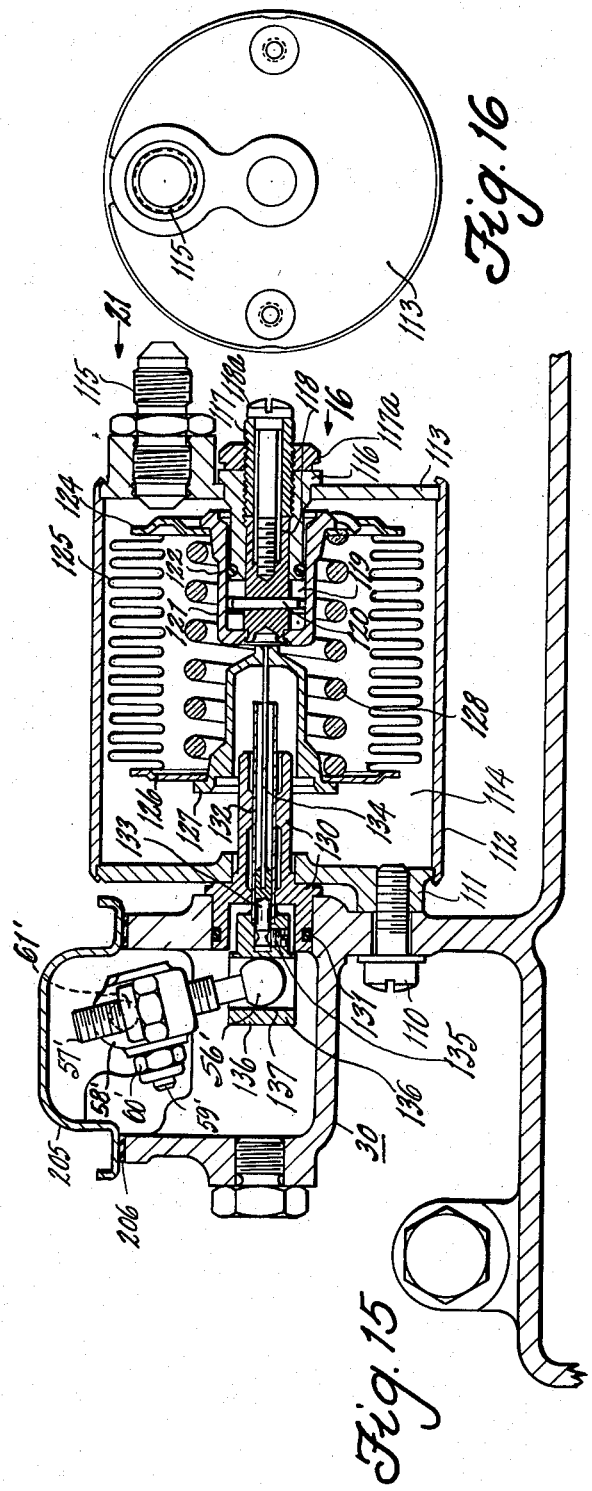

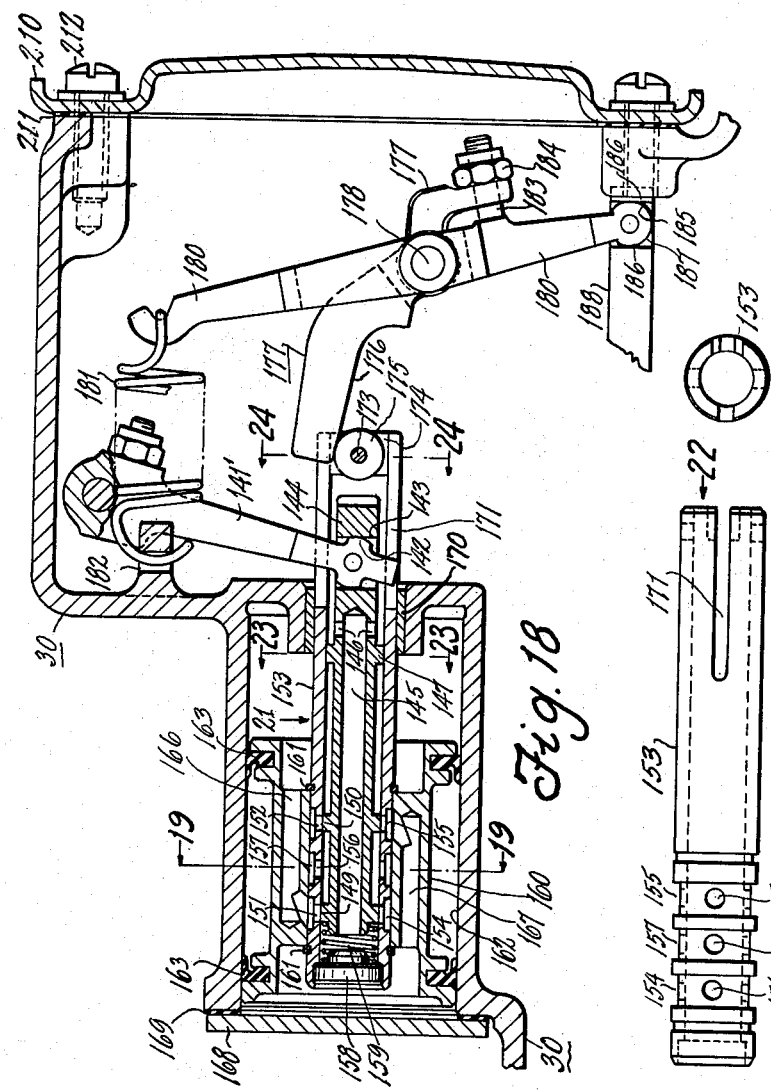

May 22, 1956  J. DOLZA ET AL  2,746,427
PRESSURE SENSING APPARATUS
Filed Jan. 31, 1951  8 Sheets-Sheet 8
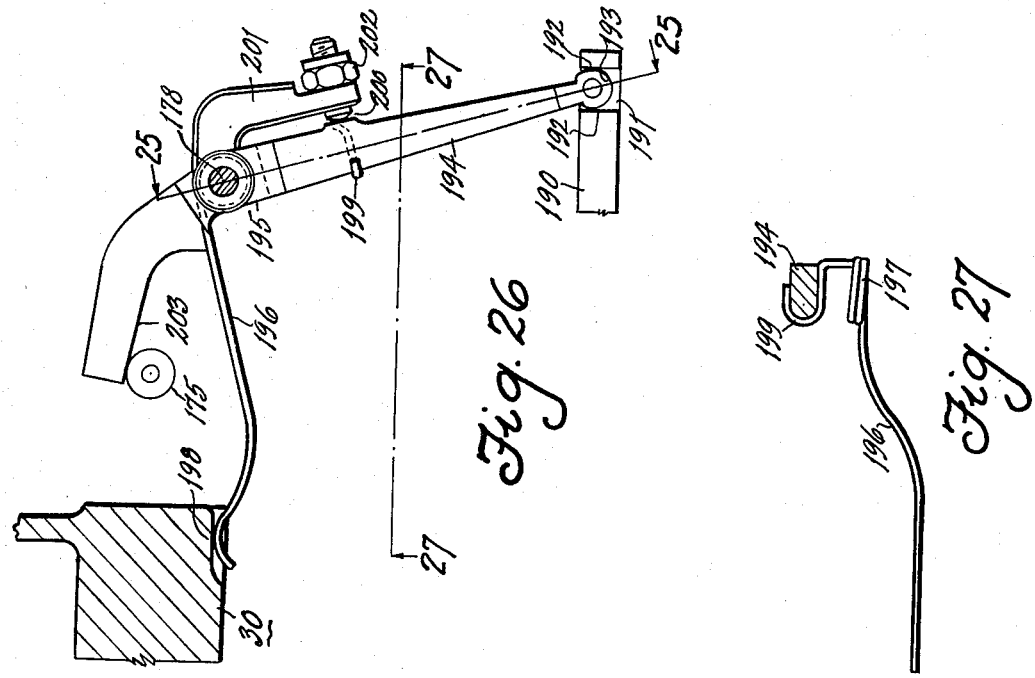
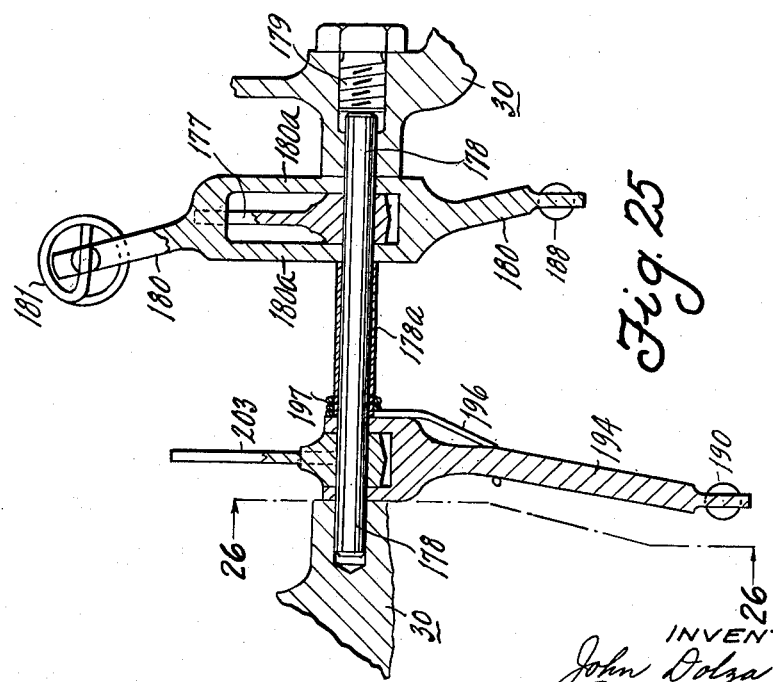
INVENTORS
John Dolza and
Robert D. Harvey
by Willits Hardman & Fehr
their ATTORNEYS

United States Patent Office 2,746,427
Patented May 22, 1956

2,746,427

PRESSURE SENSING APPARATUS

John Dolza, Fenton, and Robert D. Harvey, Huntington Woods, Mich., assignors to General Motors Corporation, Detroit, Mich., a corporation of Delaware Application January 31, 1951, Serial No. 208,798

10 Claims. (Cl. 121—41)

This invention relates to pressure sensing apparatus, such as used for example to sense the pressures at the inlet and outlet of the compressor of an internal combustion turbine used to propel an airplane.

An object of the invention is to obtain a control over some other device such as, for example, that which determines the amount of fuel supplied to the burners of an internal combustion turbine, said control being a function of the absolute pressure of some medium upon which the operation of the engine is dependent, said control being unaffected by ambient pressure. To accomplish this object, the disclosed embodiments of the invention include an evacuated bellows or aneroid which moves in accordance with change in absolute pressure of the medium, and a mechanism including a first lever actuated by the bellows, a second lever which moves in accordance with angular movements of the first lever, a member which moves in accordance with movements of the second lever and means for transmitting motion from the member to a movable part of the device to be controlled, said means including a cam so contoured that the part is located in positions in accordance with a function of the absolute pressure of the medium, for example, in accordance with the logarithm of the absolute pressure.

Other objects of the invention are to provide adjustments one of which is the adjustment of the bellows relative to its fixed support so that the cam engaging member will engage a desired portion of the cam for a given pressure. Another adjustment is to provide for changing the leverage rates of the two levers to compensate for variations in the scale of bellows movement in relation to absolute pressure. Another adjustment is provided for determining the starting position of the movable part of the device which is controlled.

In the case of embodiment of the invention, a further object is to minimize the effect upon the bellows of the heat of the medium whose absolute pressure is sensed.

Further objects and advantages of the present invention will be apparent from the following description, reference being had to the accompanying drawings wherein preferred embodiments of the present invention are clearly shown.

In the drawings:

Figs. 1 and 2 constitute a plan view of the apparatus.

Fig. 3 is a view in the direction of arrow 3 of Figs. 1 and 2.

Fig. 4 is a sectional view on line 4—4 of Fig. 3.

Fig. 5 is a view in the direction of arrow 5 of Fig. 4.

Fig. 6 is a view of a valve assembly in the direction of arrow 6 of Fig. 4 and is drawn to a larger scale.

Fig. 7 is a sectional view on line 7—7 of Fig. 6.

Fig. 8 is a view in the direction of arrow 8 of Fig. 7.

Fig. 9 is a view of a cover in the direction of arrow 9 of Fig. 4.

Fig. 10 is a view on line 10—10 of Fig. 4.

Figs. 11, 12 and 13 are sectional views taken, respectively, on lines 11—11, 12—12 and 13—13 of Fig. 10.

Figure 1:
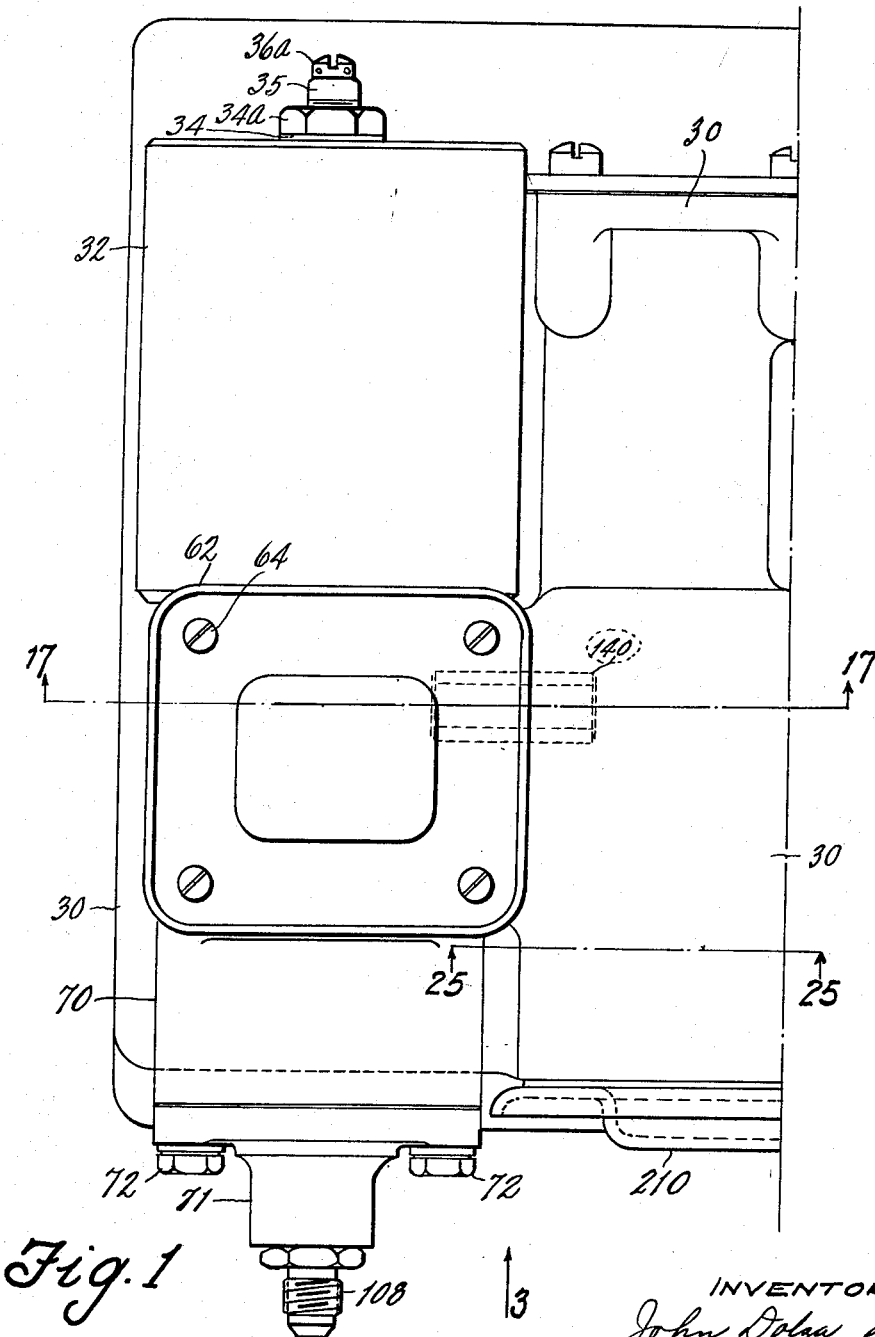
Figure 2:
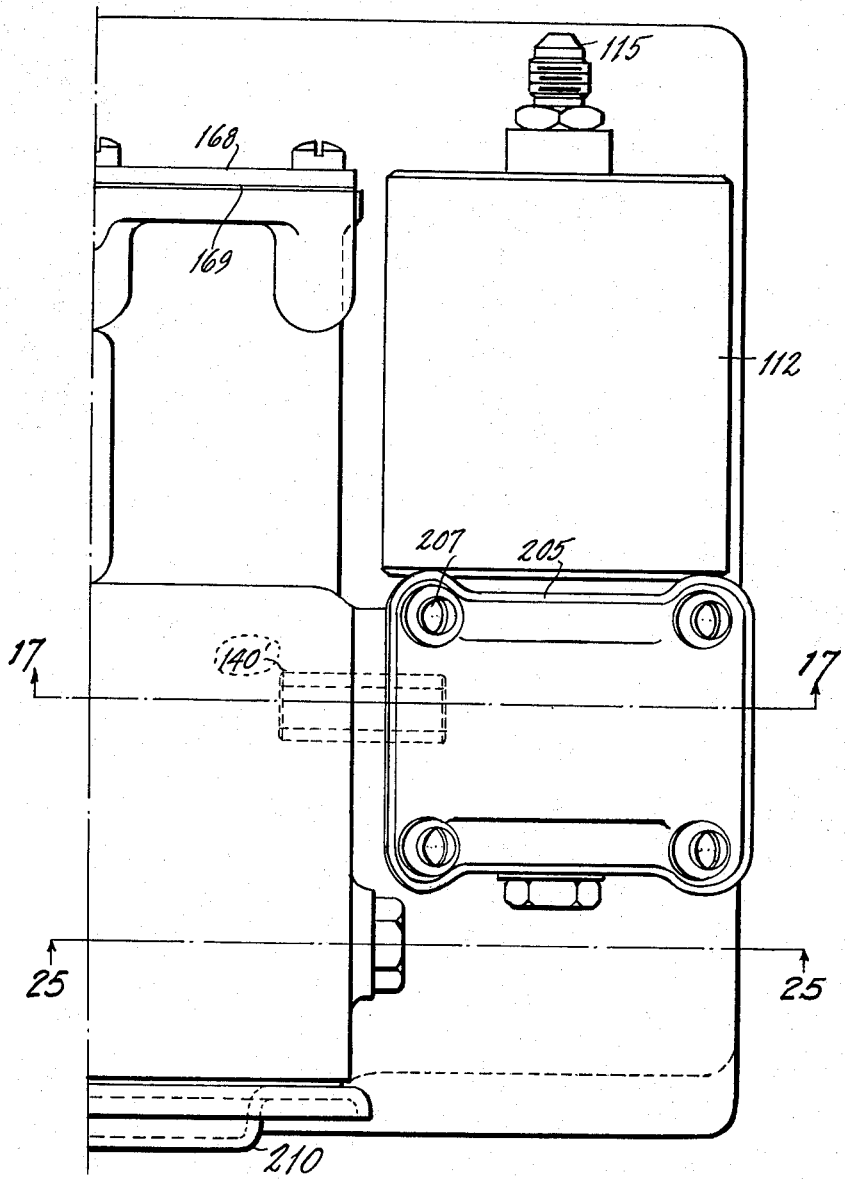

Fig. 14 is a sectional view on line 14—14 of Fig. 3.
Fig. 15 is a sectional view on line 15—15 of Fig. 3.
Fig. 16 is a view in the direction of arrow 16 of Fig. 15.
Fig. 17 is a sectional view on line 17—17 of Figs. 1 and 2.
Fig. 18 is a sectional view on line 18—18 of Fig. 3.
Fig. 19 is a sectional view on line 19—19 of Fig. 18.
Fig. 20 is a sectional view of a servo piston on line 20—20 of Fig. 19.
Fig. 21 is a view of a valve sleeve in the direction of arrow 21 of Fig. 18.
Fig. 22 is a view in the direction of arrow 22 of Fig. 21.
Figs. 23 and 24 are sectional views, respectively, on lines 23—23 and 24—24 of Fig. 18.
Fig. 25 is a sectional view on line 25—25 of Figs. 1 and 2.
Fig. 26 is a fragmentary sectional view on line 26—26 of Fig. 25.
Fig. 27 is a fragmentary sectional view on line 27—27 of Fig. 26.

Referring to Fig. 4, a housing 30 supports a ring 31 which supports a cylindrical shell or casing 32 which supports a plate 33 to which a guide sleeve 34 is brazed. Sleeve 34 threadedly receives an adjustment sleeve 35 through which a screw 36a extends. Screw 36a is threaded into a rod 36 which carries a pin 37 received by diametrical opposite notches 38 provided by sleeve 34. Rod 36 is brazed to a disc 39 brazed to a stop sleeve 40 which is brazed to a head 41 to which one end of a metal bellows 42 is brazed. A seal ring 43 supported by sleeve 34 engages the stop sleeve 40. The right end of bellows 42 is attached to a head 44 which supports a spring plate 45 retained by a snap ring 46 received by groove in head 44. A compression spring 47 is located between head 45 and a spring plate 48 supported by head 41. A compression spring 49 is located between heads 41 and 44. The bellows 42 is evacuated by a vacuum pump connected with a pipe 50 which, after evacuation of the bellows, is closed and severed.

The head 44 is connected with a rod 51 attached by nut 52 to a piston 53 having a spherical periphery 53a received within a cylindrical bore 54 provided by housing 30. Rod 51 has a notch 55 for receiving a ball 56 provided by a screw lever 57 threadedly engaging a lever hub 58 (Fig. 5) which a screw 59 and a nut 60 attach to a shaft 61. In this way movements of the bellows heads are imparted to the shaft 61 to effect rotation thereof for purpose to be described. The housing 30 provides an opening about the arm 58 which is closed by a cover 62 sealed by a gasket 63 secured by screws 64.

Housing 30 supports a valve housing 70 and a housing cover 71, said parts being retained by screws 72 which pass through holes in the cover 71, housing 70, and housing 30 and which threadedly engage the ring 31. The joints between the parts are sealed by the gaskets 73, 74 and 75. Housing 70 provides a valve guide 78 having annular grooves 76 and 77. Groove 76 is connected, as shown in Fig. 13, with ducts 78 and 79. Groove 77 is connected with ducts 80 and 81 (Fig. 12). Duct 79 (Fig. 3) is connected by duct 82 with an oil sump which chamber 83 provides if the housing 30 is inverted from the position shown when installed. If the installation does not require inverting the housing 30, the oil flowing from duct 82 into chamber 83 gravitates to the bottom of the housing not shown in Fig. 3. Duct 81 (Fig. 3) is connected by duct 84 with one of two cylinders 162 connected with a pressure oil pump (not shown) by a duct 85. A duct 86 connects the cylinders 162.

The valve guide 78 receives a valve 90 (Fig. 7) having annular grooves 91 and 92 and notches 93 at its ends. Valve 90 is secured to a wire 94 having a conical head 95 brazed to a conical seat provided by the valve 90. Wire 94 is attached to a screw 96 having a flat 97 and a hex head 98. Screw 96 extends through a hole 99 in a disc 100 which is brazed to the screw head 98. Screw 96 extends through a diaphragm 101 provided by gasket 73 and through a disc 102 shaped like disc 100 and through a washer 103. Screw 96 receives a nut 104, the tightening of which clamps the diaphragm 101 between the discs 100 and 102. The nut 104 is locked by pin 105 received by notches of the nut and the hole 106 of the screw 96. The cover 71, cooperating with the diaphragm 101, provides a pressure fluid receiving chamber 107 connectible by a coupling 108 with a pipe connected with the pressure medium whose pressure is to be sensed. For example, the coupling 108 may be connected with the outlet of the compressor of an internal combustion turbine.

The air unit pressure on the right side of diaphragm 101 is balanced substantially by the oil unit pressure on the left side of the diaphragm when the apparatus is in equilibrium. If air unit pressure exceeds oil unit pressure, valve 90 moves left to admit pressure oil to the left side of the diaphragm through groove 77 to balance the unit air pressure. If air unit pressure is less than oil unit pressure, valve 90 moves right and pressure oil escapes to the sump through groove 76. The oil in cylinder 54 received through holes 70a (Figs. 4 and 10) presses against piston 53 with substantially the same unit pressure that the air in chamber 107 presses against the diaphragm. Since piston 53 is connected with evacuated bellows 42 under control by springs 47 and 49 of predetermined calibration, piston 53 is displaced in accordance with the absolute pressure of the air in chamber 107. Piston 53 has the same effective area as bellows 42 so that ambient pressure effects are in balance. Therefore, the displacement of piston 53 is not affected by ambient pressure.

The pressure oil in cylinder 54 is the medium by which the effect of air pressure on the diaphragm 101 is communicated to the bellows 42. It is advantageous to use the oil medium because the bellows will not be appreciably affected by the temperature of the air which, in the case of use of the apparatus to sense compressor outlet pressure, may be as high as 650° F. The piston 53 has a spherical periphery 53a so that the friction between it and the cylinder is minimized and so that slight misalignment of the piston and the bellows can be tolerated. Pressure oil which leaks past the piston returns to the oil sump 83. Fig. 4 shows the piston 53 at the end of its left movement from some position at 53' occupied when the air pressure is relatively low. Left movement of piston 53 is limited by engagement of bellows head 44 with stop tube 40.

Adjustment of bellows head 41 is effected by first loosening screw 36a and nut 34a and then turning sleeve 35, the right end of which determines the location of rod 36 and therefore tube 40 and head 41. When the proper adjustment has been made for a purpose to be described, lock nut 34a is tightened and screw 36a is tightened to fix rod 36 against sleeve 35.

In order to maintain the annular convolution of the diaphragm 101 on the left side thereof as shown in Fig. 4, a light compression spring 101a is located between the washer 100 and the wall of housing 70 which provides the holes 70a. When the apparatus is idle, spring 101a urges washer 102 into engagement with cover 71. Spring 101a offers but a slight resistance to diaphragm left movement so that oil pressure at the left of the diaphragm may be, for example, only about 3 p. s. i. less than air unit pressure at the right of the diaphragm. Thus the diaphragm 101 is not allowed to shake in a manner such as to cause its convolution to become displaced to the right side of the diaphragm. It is desirable to keep the convolution on the left side of the diaphragm in order to secure smooth transition of position in the event of sudden changes in the pressure being sensed.

Referring to Fig. 15, screws 110 attach to housing 30 an end plate 111 which supports a cylindrical casing or shell 112 which supports an end plate 113. The enclosed chamber 114 is connectible by a coupling 115 with a pressure fluid source such as, for example, the inlet of a compressor of an internal combustion turbine. Plate 113 supports a guide sleeve 116 which is brazed thereto. Sleeve 116 is threadedly engaged by a sleeve 117 and is locked in adjustable position thereto by a nut 117a. Sleeve 116 receives a rod or stem 118 which a screw 118a retains against the sleeve 117. Sleeve 116 provides notches 119 which receive a pin 120 attached to stem 118. Stem 118 is attached to a cup 121 supported by the sleeve 116 and sealed by a ring 122. The cup 121 supports a bellows head 124 brazed thereto and to one end of a metal bellows 125, the other end of which is brazed to a head 126 brazed to a cup 127. A compression spring 128 is located between bellows heads 124 and 126.

Plate 111 is attached to a sleeve 130 received by hole provided by the housing 30 and sealed by a ring 131. The sleeve 130 supports a tube 132 which supports a coupling 133 connected by wire 134 with the cup 127. Coupling 133 is connected by a screw 135 with a block 136 having a notch 137 which receives a ball 56' provided by a screw lever 57' connected with a hub 58' attached by a screw 59' and nut 60' to a shaft 61'. The parts referred to by numbers with primes affixed are like the similarly numbered parts shown in Fig. 4.

The bellows head 124 is adjusted by first loosening lock nut 117a and screw 118a. Sleeve 117 is turned in sleeve 116 to displace the inner end of sleeve 117 which determines the location of stem 118, cup 121 and head 124. When this adjustment has been made for a purpose to be described, the nut 117a is tightened and screw 118a is tightened to fix the stem 118 against the sleeve 117.

Referring to Fig. 17, it will be seen that the shafts 61 and 61' are journaled in bearings 140 and 140' and are connected with levers 141 and 141', respectively. The fit between shafts 61 and 61' and bearings 140, 140' is so close as to prevent passage of oil from chamber 83 (Fig. 3) which houses levers 141, 141'. Therefore, in case housing 30 is installed in inverted position, oil does not flow from the sump into bellows chamber 114 (Fig. 15). After loosening lock nuts 57a, 57a' screw levers 57, 57' can be turned to thread them relative to hubs 58, 58' in order to change the ratio of these levers with respect to their associated levers 141, 141' for a purpose to be described. Each of the levers 141 and 141' is connected with a similar servo mechanism. Referring to Fig. 18, lever 141' provides spherical surfaces 142 bearing against surfaces 143 provided by a valve 144 having a central bore 145 connected with side openings 146. Valve 144 has shoulders 147 provided with notches 148 (Fig. 23). Valve 144 has lands 149 and 150 which are normally adjacent ports 151 and 152, respectively, of a valve guide sleeve 153. Ports 151 open into a groove 154 and ports 152 into a groove 155 of the sleeve 153. The interior of the sleeve is connected by ports 156 with an annular groove 157. Sleeve 153 receives a plug 158 which retains a spring 159 which urges the valve 144 toward the right so as to take up lost motion in one direction between the valve and the lever 141'. A piston 160 is connected with the sleeve 153, said piston being fixed axially relative to the sleeve 153 by snap rings 161 received by grooves of the sleeve. Piston 160 is received by a cylinder 162 provided by housing 30 and receiving pressure oil from duct 85 (Fig. 3). Piston rings 163 of rubber-like material engage the cylindrical interior wall the cylinder.

Piston 160 provides passages 165 communicating with groove 157 of the sleeve 153. Groove 154 of sleeve 153 is connected with the right end of cylinder 162 by passages 166 in the piston. Groove 155 of the sleeve 153 is connected by passages 167 of the piston with the left end of the cylinder 162 which is closed by a cover 168 sealed by a gasket 169.

Sleeve 153 is guided by a bearing 170 supported by the housing 30 and it provides notches 171 for receiving the lever 141'. The sleeve 153 supports a pin 173 which passes through spacers 174 which are segments of a cylinder and through a roller 175. Roller 175 is engaged by a cam surface 176 of a lever 177 supported by a rod 178, which, as shown in Fig. 25, is supported by housing 30 and is retained by a screw 179. A portion of lever 177 is received by the yoke portion 180a of a lever 180 which is journalled on rod 178. Spring 181 connects the upper end of lever 180 with an eye 182 provided by a housing 30. This spring urges lever 180 counterclockwise into engagement with an adjustment screw 183 threaded through lever 177 and locked in adjusted position by a nut 184. The lower end of lever 180 is provided with a cylindrical surface 185 received by plane surfaces 186 forming the sides of a notch 187 in a bar 188 which is guided for longitudinal movement in accordance with fluid pressure in chamber 114 (Fig. 15). Bar 188 is a movable part of another device under control by fluid pressure in chamber 114. Bellows 125 expands or contracts with variations in pressures surrounding it. The valve 144 (Fig. 18) is displaced and piston 160 and sleeve 153 are displaced by an amount equal to displacement of valve 144. Consequently, the bar 188 is displaced in accordance with change of pressure in chamber 114. The cam surface 176 of lever 177 may be shaped so that the displacement of bar 188 will follow change in pressure in chamber 114, according to a certain schedule. For example, the position of bar 188 may be the logarithm of the absolute pressure in chamber 114.

In a similar manner expansion or contraction of bellows 42 (Fig. 4) is transmitted to a horizontally movable bar 190 (Fig. 26) of a device under control by the air pressure to which diaphragm 101 (Fig. 4) is subjected. Bar 190, which is guided for longitudinal movement, provides a notch 191 the plane side surfaces 192 of which receive the cylindrical surfaces 193 provided by a lever 194 having bifurcated hub 195 journalled upon rod 178. A spring 196, having turns 197 which surround a spacer sleeve 178a surrounding rod 178 (Figs. 3 and 25), bears at 198 against a portion of housing 30 and at 199 against the lever 194 to urge it counterclockwise into an engagement with an adjustment screw 200 threaded through a lever 201 and locked in adjusted position by nut 202. Lever 201 is journaled on shaft 178 and provides a cam surface 203 for engaging the roller 175 of another servo apparatus like the one shown in Fig. 18. This other servo has a valve which is located by arm 141 (Fig. 17) which is displaced in accordance with the displacement of piston 53 (Fig. 4). The cam surface 203 may be shaped so that bar 190 is displaced in accordance with a certain function of the air pressure to which diagram 101 is subjected. For example, the position of bar 190 may be in accordance with the logarithm of absolute pressure to which diaphragm 101 is subjected.

Bars 188 and 190 may be parts of the same device, the function of which is dependent upon the absolute unit pressure respectively at the inlet and outlet of a compressor of an internal combustion turbine.

Each of the cam surfaces 176 (Fig. 18) and 203 (Fig. 26) is intended to locate its associated, controlled bar 188 or 190 in a definte position in accordance with a certain function of the absolute pressure sensed by its associated pressure sensing apparatus. Therefore the cam and its engaging roller must be in a definite relation and the cam and the controlled bar must be in a definite relation for each sensed absolute pressure. To effect this, the relatively fixed bellows heads can be adjusted as described in order that the cam engaging members will engage the proper portions of the cam surfaces according to predetermined schedules of absolute pressures and cam positions; and the levers 180 and 194 can be adjusted angularly relative to their associated cams so that the associated controlled bars 188 and 190 will be properly related to the cams. To compensate for variations in rates of the bellows controlling springs, screw levers 57 and 57' can be adjusted in effective length so that the leverage ratios of these screw levers and their associated levers 141, 141' (Fig. 17) can be changed.

The mechanical connections between the moving parts of the apparatus are spring biased in such manner that all lost motion is taken up. The device of which bars 188 and 190 are parts provides spring means for urging these bars to the right in Figs. 18 and 26 so that there is no lost motion between levers 180 and 194 and bars 188 and 190 respectively.

While the embodiments of the present invention as herein disclosed, constitute a preferred form, it is to be understood that other forms might be adopted.

What is claimed is as follows:

1. Pressure responsive apparatus having in combination, a movable control element which is positioned in accordance with variations in pressure in a fluid medium and means for variably positioning such element upon variations in fluid pressure including an evacuated metal bellows having fixed and movable heads and resilient means opposing collapse of the bellows, a pressure sensing element movable in response to variations in fluid pressure, means controlled by said pressure sensing element for effecting movements of the movable bellows head as said element is moved, means for effecting movement of the control element including a cam and a cam engaging member, one of which is operatively connected with the movable bellows head and the other with the control element, said cam having a contour such that the relation of the displacement of the control element to the displacement of the movable bellows head is in accordance with a predetermined schedule.

2. Apparatus according to claim 1 in which the cam has a contour such that the displacement of the control element is in accordance with the logarithm of the unit pressure of the fluid medium to which the movable bellows head is subjected.

3. Apparatus according to claim 1 in which means are provided for shifting the pressure sensing element axially of its bellows in order to obtain the desired location of the cam engaging member relative to the cam for a given unit pressure of the medium to which the movable bellows head is subjected.

4. Apparatus according to claim 1 in which the means for effecting movement of the control element includes two levers and a shaft connecting them, one of the levers being movable with the movable bellows head and the other lever imparting a movement dependent on the ratio of the levers, and in which the effective length of one of the levers is adjustable in order to compensate for deviation of the characteristics of the bellows spring from a certain standard.

5. Apparatus according to claim 1 in which means are provided adjusting the relation of the control element to one of the said members in order to determine the starting location of the control element with respect to a certain unit pressure of the medium to which the movable bellows head is subjected.

6. Apparatus according to claim 1 in which the means for effecting movement of the control element includes two levers and a shaft connecting them, one of the levers being operatively connected with the movable bellows head, means under control by the other lever for effecting displacement of the cam engaging member in accordance with displacement of said levers, and means positioned by the cam for determining the position of the control element.

7. Apparatus according to claim 1 in which the means for effecting movement of the control element includes two levers and a shaft connecting them, one of the levers being operatively connected with the movable bellows head, an hydraulic servo comprising a control valve positioned by the other lever and a valve-following piston which positions the cam engaging member, and means positioned by the cam for determining the position of the control element.

8. Apparatus according to claim 1 in which the means for effecting movement of the control element includes two levers and a shaft connecting them, one of the levers being operatively connected with the movable bellows head, an hydraulic servo comprising a control valve positioned by the other lever and a valve-following piston which positions the cam engaging member, a rod on which the cam is pivotally mounted, a third lever pivoted on said rod and connected with the control element and a spring for urging the third lever into engagement with the cam and the cam into engagement with the cam engaging member.

9. Apparatus according to claim 1 in which the means for effecting movement of the control element includes two levers and a shaft connecting them, one of the levers being operatively connected with the movable bellows head, means under control by the other lever for effecting displacement of the cam engaging member in accordance with displacement of said levers, a rod on which the cam is pivotally mounted, a third lever pivoted on said rod and connected with the control element and a spring for urging the third lever into engagement with the cam and the cam into engagement with the cam engaging member.

10. Apparatus according to claim 1 in which the means for effecting the application of the pressure of the medium to the movable bellows head comprises a piston, a cylinder in which the piston is movable and which receives hydraulic fluid under pressure, said piston having its peripheral edge formed spherically to minimize friction, a rod connecting the piston with the movable bellows head, a chamber which receives the medium whose pressure is sensed, a diaphragm separating said chamber from the cylinder, a valve connected with the diaphragm for controlling the flow of hydraulic fluid from a pressure source into the cylinder or from the cylinder to a sump in order that, in equilibrium position of the valve, unit pressures on opposite sides of the diaphragm will be substantially equal, and a chamber enclosing the bellows and receiving hydraulic fluid forced past the piston, said chamber being connected with a sump, said piston and movable bellows head having equal effective areas whereby displacement of said bellows head is unaffected by ambient pressure.

References Cited in the file of this patent

UNITED STATES PATENTS

| | | |
|---|---|---|
| 2,358,845 | Alexanderson | Sept. 26, 1944 |
| 2,376,144 | Levine | May 15, 1945 |
| 2,502,776 | Burdick | Apr. 4, 1950 |
| 2,507,498 | Brown | May 16, 1950 |
| 2,516,123 | Jorgensen | July 25, 1950 |
| 2,672,851 | Jorgensen | Mar. 23, 1954 |

FOREIGN PATENTS

| | | |
|---|---|---|
| 346,503 | Great Britain | 1931 |